(12) United States Patent
Thunemann (10) Patent No.: US 7,606,688 B2
(45) Date of Patent: Oct. 20, 2009

(54) OBJECT ORIENTED FINITE ELEMENT MODELING TOOLS

(75) Inventor: Paul Z. Thunemann, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 10/898,931

(22) Filed: Jul. 27, 2004

(65) Prior Publication Data

US 2006/0025974 A1 Feb. 2, 2006

(51) Int. Cl.
*G06F 17/50* (2006.01)
*G06F 7/60* (2006.01)
*G06F 17/10* (2006.01)
*G06G 7/48* (2006.01)

(52) U.S. Cl. .................... 703/6; 703/2; 703/7
(58) Field of Classification Search .............. 703/1, 703/2, 6, 7; 345/423, 420; 700/182
See application file for complete search history.

(56) References Cited

U.S. PATENT DOCUMENTS

| | | | | | |
|---|---|---|---|---|---|
| 5,345,490 | A | * | 9/1994 | Finnigan et al. ............. | 378/4 |
| 5,363,475 | A | * | 11/1994 | Baker et al. ................ | 345/422 |
| 6,342,886 | B1 | * | 1/2002 | Pfister et al. ............... | 345/424 |
| 6,570,568 | B1 | * | 5/2003 | Horn et al. ................. | 345/428 |
| 6,982,710 | B2 | * | 1/2006 | Salomie .................... | 345/420 |
| 7,406,403 | B2 | | 7/2008 | Fox et al. | |

OTHER PUBLICATIONS

R. Mukundan, "Teaching Computer Graphics Using Java", SIGCSE Bulletin, Dec. 1999 vol. 31. No. 4, pp. 66-69.*
Sensmeier et al., "Automatic Aircraft Structural Topology Generation for Multidisciplinary Optimization and Weight Estimation," available at <http://ntrs.nasa.gov/archive/nasa/casi.ntrs.nasa.gov/20050175694_2005173048.pdf>, last visited Apr. 7, 2009.

* cited by examiner

*Primary Examiner*—Paul L Rodriguez
*Assistant Examiner*—Dwin M Craig (57) ABSTRACT

Techniques for creating a finite element model are disclosed that include various processes including: superimposing a rectangular array of nodes and nodal-pointers onto a wireframe geometry, and creating a set of geometric-elements using the rectangular array.

21 Claims, 12 Drawing Sheets

| D | X | U | X | U | U | D | X | U | U | D | X |
|---|---|---|---|---|---|---|---|---|---|---|---|
| X | X | U | X | U | U | D | X | U | U | U | R |
| D | X | U | X | U | L | D | X | U | L | L | L |
| D | X | X | X | L | X | L | X | U | X | L | X |
| X | X | X | X | L | X | L | X | L | X | L | X |
| X | X | X | X | X | X | X | X | X | X | X | X |
| R | R | R | R | X | R | D | X | X | R | X | X |
| R | R | R | R | R | D | X | X | X | D | X | X |
| R | D | X | X | X | D | X | X | X | D | X | X |

OBJECT ORIENTED FINITE ELEMENT MODELING TOOLS

FIELD OF THE INVENTION

This invention relates to methods and systems for conducting finite element modeling.

BACKGROUND OF THE INVENTION

The Finite Element Model (FEM) is a tool useful for determining the integrity of a given mechanical structure. For example, aircraft designers have long used finite element models to predict how internal and external stresses will manifest themselves throughout each portion of a particular wing design during various flight maneuvers.

While FEMs play an important part in the design and testing of aircraft, automobiles, buildings and hundreds of other structures, the computer-based tools available performing finite state analysis have a long history of unresolved shortcomings. For instance, a designer using known FEM tools generally requires an excessive amount of time to create an appropriate FEM for even a relatively simple structure. Further, once such a FEM is created, it may be rendered useless should the designer wish to make anything but the most modest changes to the structure's design. Accordingly, new methods and systems related to finite element modeling are desirable.

SUMMARY OF THE INVENTION

In various embodiments, a method for creating a finite element model is based on the steps of superimposing a mesh of nodes and nodal-pointers onto a wire-frame geometry, then creating a set of geometric-elements using the rectangular mesh of nodes and nodal-pointers.

An one aspect, an apparatus for creating a finite element model employs an array-forming means for forming an array of nodes and nodal-pointer based on a mesh of points as well as an element-building means for creating a set of geometric-elements using the array. In another aspect, an apparatus for creating a finite element model employs a memory containing a mesh of nodes representative of a geometric structure as well as a modeling-means for forming a finite-element model based on the mesh. In a third aspect, an apparatus for analyzing a structure uses an element-building device configured to operate on a rectangular mesh, where the rectangular mesh is an N-by-M array containing a plurality of nodes and at least one nodal-pointer pointing to a first node.

Also in various embodiments, a storage medium stores a plurality instructions that, if executed, enables a processor-based system operate on finite element models, the instructions including a collection of one or more first object-oriented routines capable of creating a finite element model of a first structure.

There has thus been outlined, rather broadly, certain embodiments of the invention in order that the detailed description thereof herein may be better understood, and in order that the present contribution to the art may be better appreciated. There are, of course, additional embodiments of the invention that will be described or referred to below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The advantages of using the disclosed methods and systems are notable not just for their apparent utility, but also because they transcend any comparable approach relating to finite element model formation. The inventor of the disclosed methods and systems has created an entirely new approach to FEM tools with new and unique advantages. Such advantages include, but are not limited to, the availability of tools capable of quickly developing new FEMs despite dramatic design changes that might be made to a given structure. Such advantages also include improved data structures, e.g., rectangular arrays, that lend themselves to the availability of object-oriented FEM software that is both highly portable and capable of treating FEMs as objects. For example, while analyzing a non-rectangular object, such as a triangular wing, the actual number of FEM nodes might decrease toward the tip of the wing. However, the node topology pathways of the wing (a pathway capable of being represented by a constant column or row value) can, in a sense, "collapse" upon one another by virtue of pointers placed within the data structure.

Figure 1:
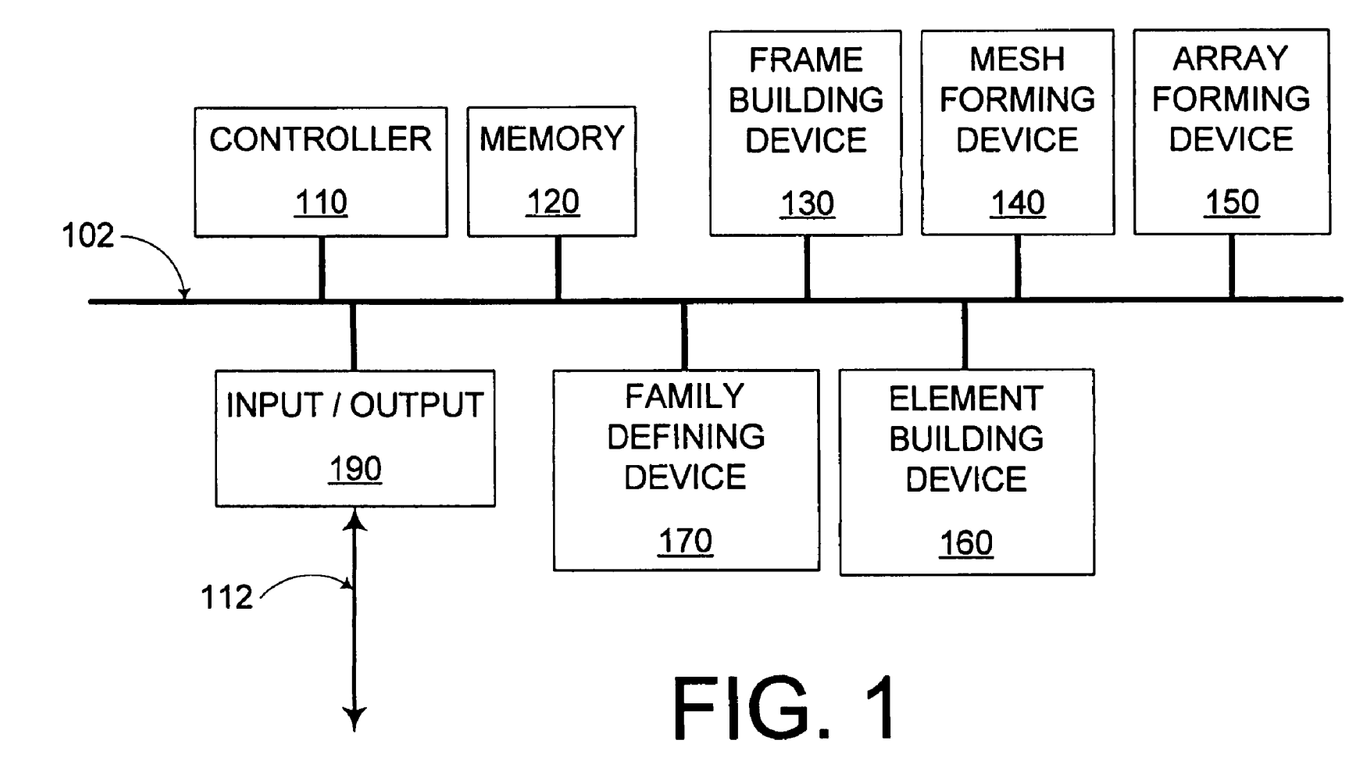
FIG. 1 is a block diagram depicting a device capable of forming a finite element model.

FIG. 1 is an exemplary modeling device 100 according to the disclosed methods and systems. As shown in FIG. 1, the exemplary modeling device 100 includes a controller 110, a memory 120, a frame-building device 130, a mesh-forming device 140, an array-forming device 150, an element-building device 160, a family-defining device 170 and an input/output device 190. The above components 110-190 are coupled together by control/data bus 102.

Although the exemplary modeling device 100 of FIG. 1 uses a bussed architecture, it should be appreciated that any other architecture may be used as is well known to those of ordinary skill in the art.

It also should be appreciated that some of the above-listed components can take the form of software/firmware routines residing in memory 120 capable of being executed by the controller 110. More particularly, it should be understood that the functions of any or all of components 130-170 can be accomplished using object-oriented software, thus increasing portability, software stability and a host of other advantages not available with non-object-oriented software.

In operation, an operator using the modeling-device 100 can first create a wire-frame geometry of a structure of interest; a "wire-frame geometry" being a form of skeletal outline of the structure. Accordingly, such an operator can access the frame-building device 130 where he may create a wire-frame geometry using a variety of techniques, including using piecemeal construction of lines and preexisting shapes, performing freeform sketches of curves, and by defining curves via splines or mathematical equations. However, it should be appreciated that the particular tools and techniques used to create a given wire-frame geometry can vary from embodiment to embodiment as required or otherwise desired. Further, it should be appreciated that, instead of generating a wire-frame geometry, the modeling-device 100 can optionally import a wire-frame geometry via the input/output device 190 and link 112.

Figure 2:
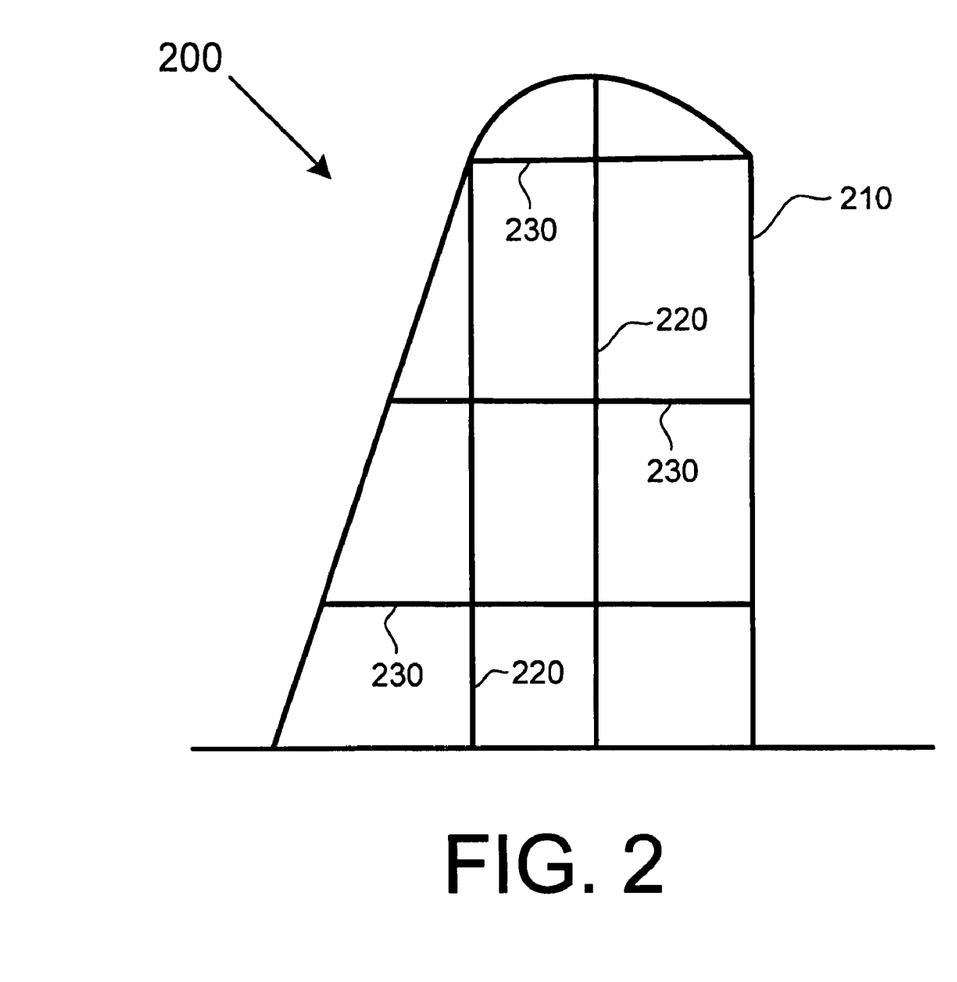
FIG. 2 depicts an exemplary two-dimensional wire-frame geometry.

FIG. 2 depicts an exemplary wire-frame geometry 200 to aid in the understanding of the disclosed methods and systems. As shown in FIG. 2, the exemplary wire-frame geometry 200 depicts a wing-like structure having an outer-perimeter 210 along with a number of inner lateral-ribs 220 intersecting a number of inner longitudinal-ribs 230. While the exemplary wire-frame geometry 200 of FIG. 2 is perhaps best described as a "sparse" wire-frame geometry, it should be appreciated that the particular density of frame members within a wire-frame geometry can, in various embodiments, vary as may be desired or otherwise required.

Once the wire-frame geometry 200 is completed (or imported), the operator can send a signal to the modeling device 100 to superimpose/overlay a "mesh" over the wire-frame geometry 200. In response, the modeling device 100 can transfer the wire-frame geometry 200 to the mesh-forming device 140.

The mesh-forming device 140, in turn, can apply any number of rules to form an adequate mesh. For example, a mesh can be defined to have points superimposed on the spares 220 and 230 (with possible interstitial points in between), defined by various spacing rules, determined according to a maximum allowed number of points and so on. In sum, the exemplary mesh-forming device 140 can apply any known or later developed approach for superimposing a mesh of points over a frame with varying accuracy and performance in the final FEM product to be expected.

Figure 3A:
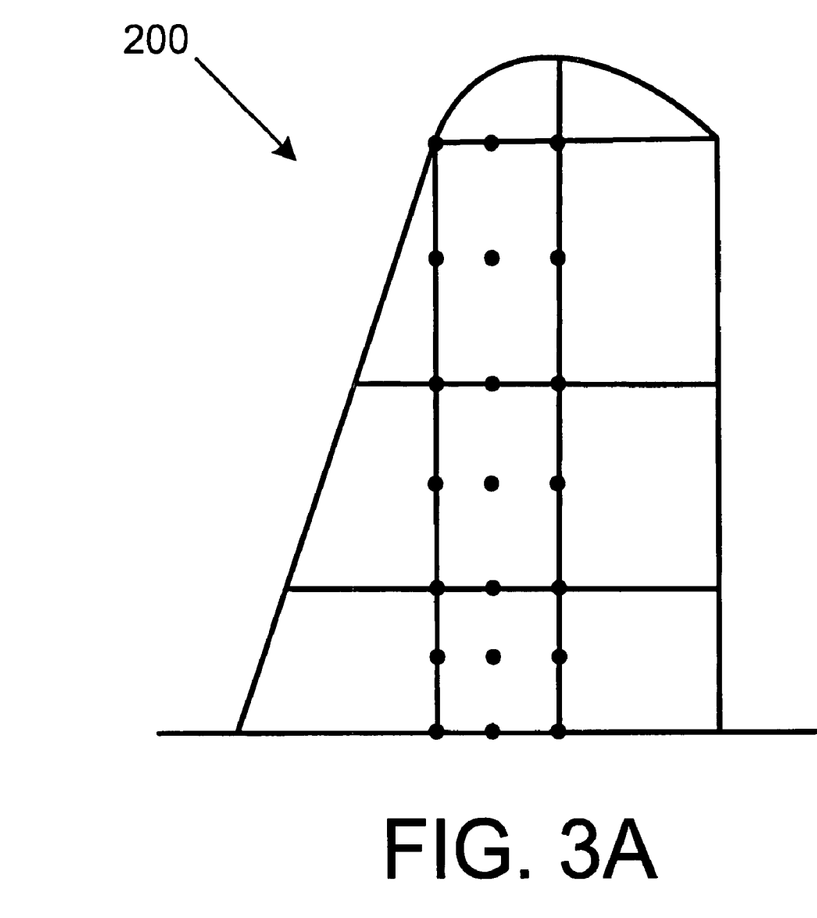
FIG. 3A is the wire-frame geometry of FIG. 2 with a first mesh of points superimposed.
Figure 3B:
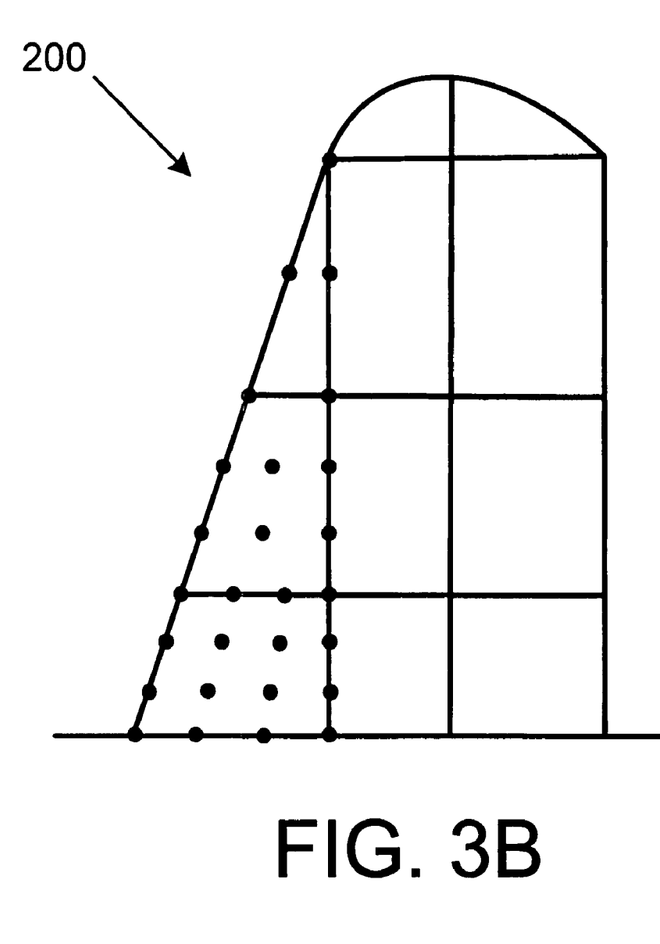
FIG. 3B is the wire-frame geometry of FIG. 2 with a second mesh of points superimposed.
Figure 3C:
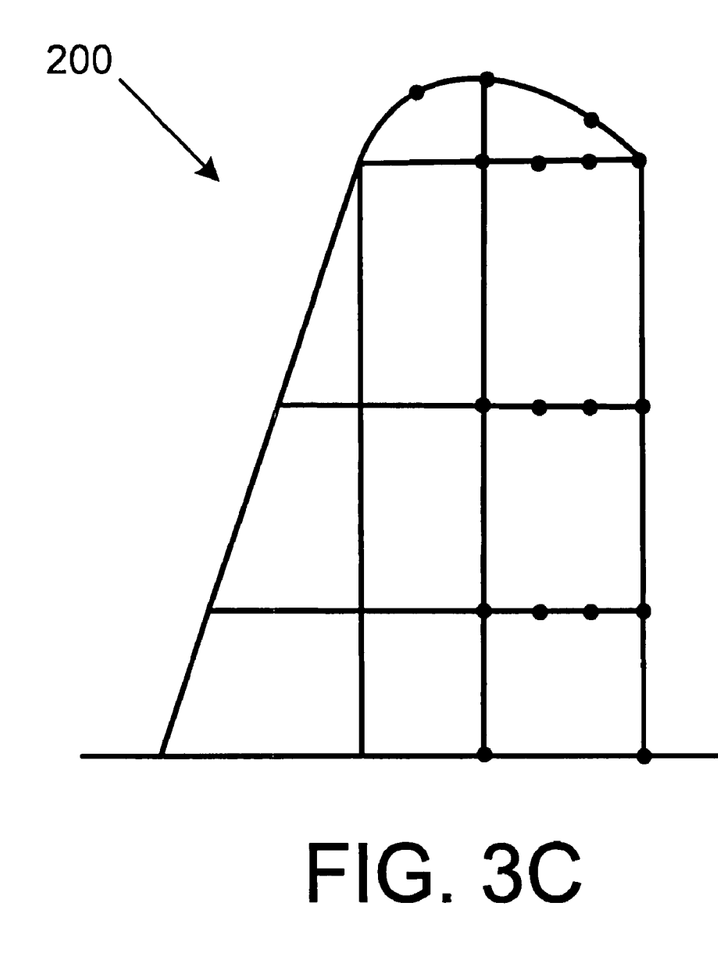
FIG. 3C is the wire-frame geometry of FIG. 2 with a third mesh of points superimposed.

FIGS. 3A-3C depict three separate meshes covering various portions of structure 200 with FIG. 3A depicting mesh points covering the middle portion of structure 200, FIG. 3B depicting mesh points covering the front portion of structure 200 and FIG. 3B depicting mesh points covering the back and tip portions of structure 200. As is demonstrated by FIGS. 3A-3C, defining a FEM mesh for a single structure can be a piecemeal procedure. Further, as is demonstrated by FIG. 3D, which depicts a composite of the different meshes of FIGS. 3A-3C, composite/finished meshes can often take an irregular, asymmetric form.

Figure 3D:
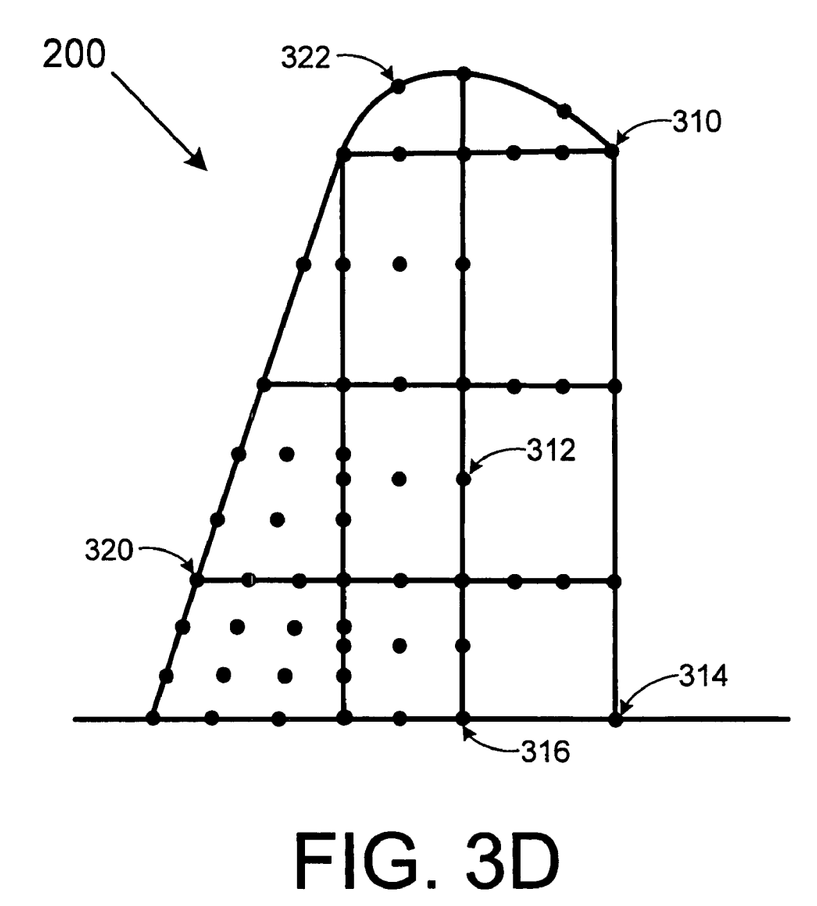
FIG. 3D is the wire-frame geometry of FIG. 2 with a composite mesh of points superimposed.

In view of the composite mesh of FIG. 3D (with points 310-322 labeled for future reference), it should be appreciated that such meshes are not well suited for standard data structures, such as an M-by-N rectangular array. However, the inventor of the instant methods and systems has nonetheless developed an approach to dispose such irregularly arranged points into such a rectangular array.

Figure 4A:
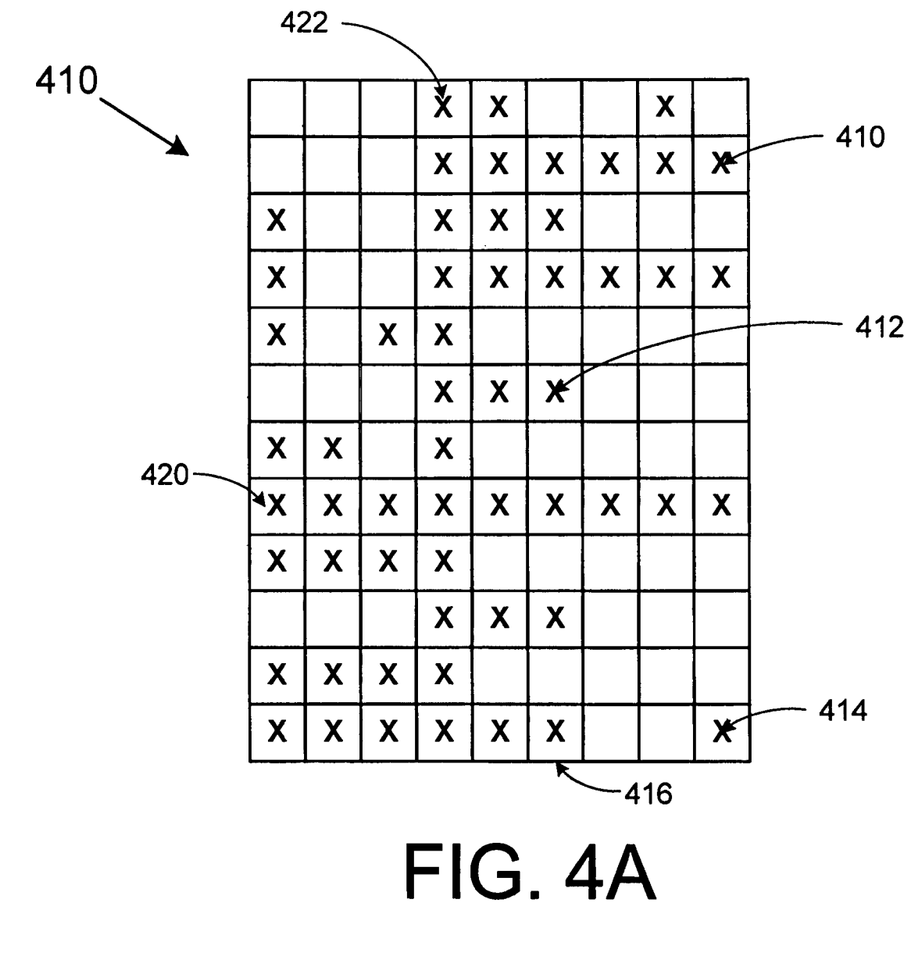
FIG. 4A depicts the nodes of FIG. 3D disposed into an M-by-N array.

FIG. 4A depicts a 9-by-12 array 410 having 56 of its 108 cells occupied by indicators (each represented by an "X") that mark/define such cells as a node. That is, each "X" indicates a node representing a respective point on the mesh of FIG. 3D, as is demonstrated by nodes 410-422, which can be mapped to respective points 310-322 of FIG. 3D.

It should be appreciated that building a rectangular array and strategically mapping nodal points to specific cells can require a certain amount of finesse for the best results. One particular approach that can be used is outlined by the pseudo-code provided below:

```
//------------------------------------------//
// Base code: Create a mesh for an entire structure
// of interest such as an airplane body or building,
// by first creating meshes for individual
// components, then integrating component meshes
MeshStructure( )
    For Each Component( )
        MeshComponent( )
    EndFor
integrateComponents( )
EndProgram
//------------------------------------------//
// This routine builds meshes for an individual
// component. A Component could be any part of a
// structure, such as a wing or a fuselage of an
// airplane etc. (See wing 200 of FIG. 2)
MeshComponent( )
    For Each Section( )
        MeshSection( )
    EndFor
// Now "condense" the nodes. That is, make one node
// where two or more would otherwise occupy the same
// position. Node 316 of FIG. 3D is a condensed
// node resulting from nodes shown in FIGS. 3A and
// 3C. Creating condensed nodes ensures a
// rectangular array and that node paths of "real"
// curves are constant across the array.
    Add condensed nodes
EndRoutine
//------------------------------------------//
// This routine builds meshes for an individual
// sections of a component. FIGS. 3A-3C depict
// building such meshes. A Section can be any part
// of a component as defined by the user.
MeshSection( )
    For Each Partition( )
        MeshPartition( )
    EndFor
    Add condensed nodes
//------------------------------------------//
// A partition is a part of a Section that has the
// same number of crossing stringers.
MeshPartition( )
    For Each Rib( )
        createTrueNodes( )
    EndFor
    Add condensed nodes
//------------------------------------------//
```

Figure 4B:
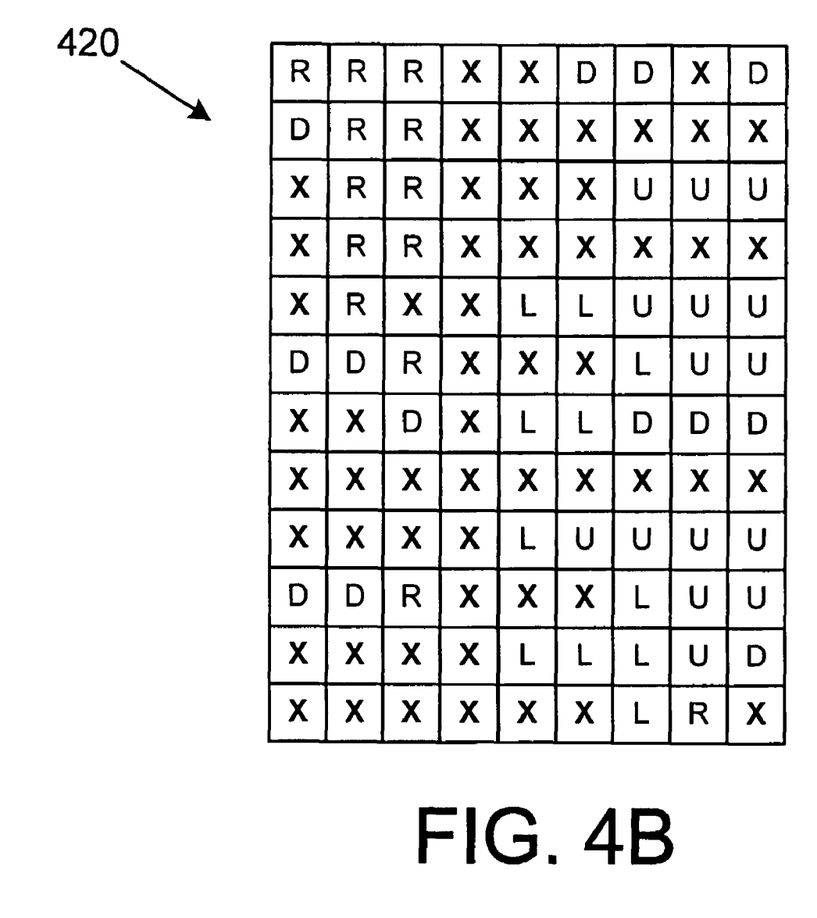
FIG. 4B depicts the array of FIG. 4A with added nodal-pointers.

Once the array 410 is initially populated with nodes (true nodes), the array forming device 150 can assign pointers to the blank cells. For example, as shown in FIG. 4B, the array of nodes 410 of FIG. 4A can be transformed into an array 420 of nodes and nodal-pointers with the nodal-pointers marked as one of "U", "D", "L" and "R" representing up, down, left and right pointers respectively.

Figure 5:
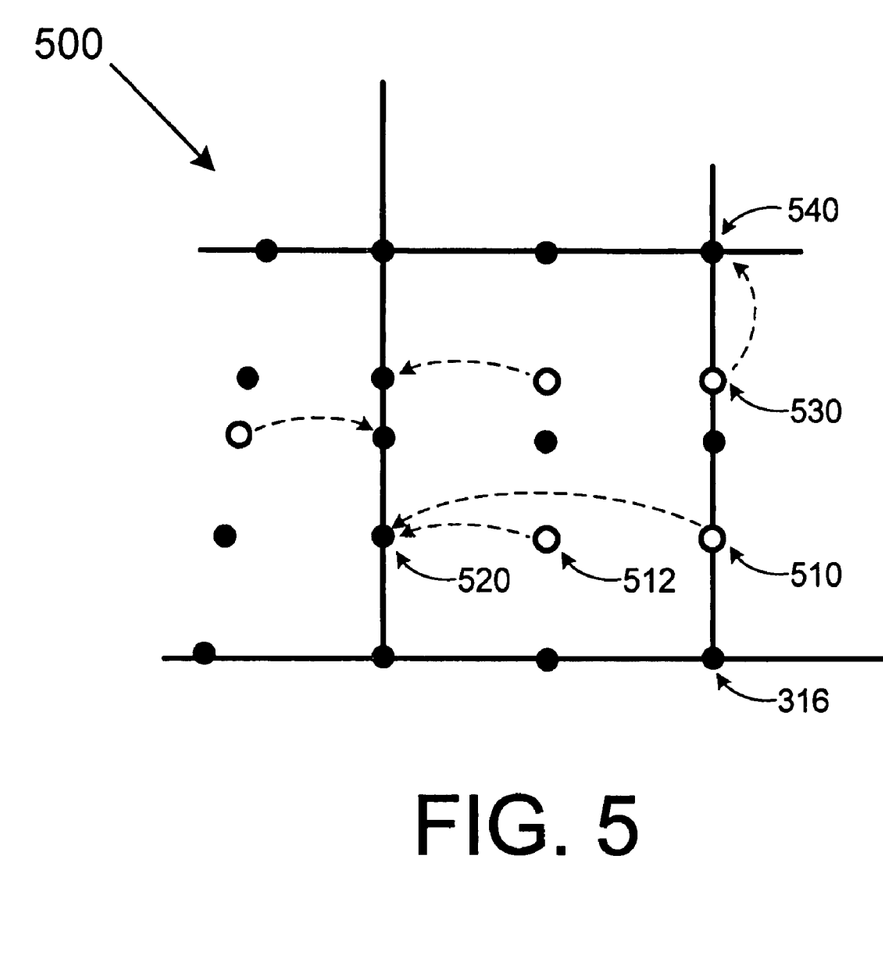
FIG. 5 depicts the relationships between nodes and nodal-pointers.

It should be understood that a nodal-pointer, unlike a node, does not represent a unique point from a FEM mesh. To the contrary, even though a nodal-pointer may occupy a distinct position/cell in a array of points, e.g., a double-scripted array, it does not directly represent a unique point, but refers instead to a valid node. For example, FIG. 5 depicts the lower-middle portion 500 of the nodal-mesh of FIG. 3D with a number of nodes (represented by dots) and nodal-pointers (represented by circles) as would be defined by array 410 of FIG. 4B. As is shown in FIG. 5, nodal-pointers 510 and 512 point to node 520, and nodal-pointer 530 points to node 540. While the exemplary nodal-pointers are depicted as pointing to the first valid node in the same row or column, it should be appreciated that the nodal-pointers can refer to nodes in the same column refer to nodes in the same column, refer to nodes in adjacent columns and rows, refer to adjacent nodal-pointers which in turn refer to nodes, etc.

Again returning to FIG. 1, once the modeling-device 100 has established an array of nodes and nodal-pointers, the modeling-device 100 can transfer the array from the array-forming device 150 to the element-building device 160 where a number of geometric-elements can be created based on the nodal-mesh.

The present methods and systems provide a vast advantage over previously known systems in part due to the nature of the exemplary rectangular nodal-mesh. That is, the disclosed configuration of nodes and nodal-pointers effectively allows various node-paths, e.g., individual rows in a rectangular-array, to "collapse" upon one another while maintaining rectangular form. The resultant advantages include a system where: (1) the integrity of a mechanical model will not degrade even though as a wire-frame geometry tapers or otherwise varies, while (2) the advantages of using a rectangular-array are preserved, such advantages including ease of processing and use of objects and object-oriented code.

An "object" is a software module that contains a collection of related procedures and data. Each object can have a basic purpose or function that it performs. Unlike non-object oriented software where code and data are separate, each object contains the data used in performing it function as well as the code. It is self-contained. Constructed properly, object-oriented software has many advantages over non-object software. For example, it is more stable and less prone to crashing when changes are made, particularly in the case of complex systems. Because the code and data are co-located within each object, they don't fall out of synch when software is changed, which is a common problem of traditional non-object-oriented systems. Accordingly, the present systems and methods can provide a set of object-oriented software FEM routines that can be consistently reused with minimum software development and maintenance costs.

With the above-disclosed advantages in mind, it should be appreciated that the techniques used by the element-building device 160 to define individual geometric-elements will vary from conventional systems. For example, assume a system where the geometrical elements are to be limited to tetragons, triangles and lines (noting that other polygons are plausible) with tetragons defined by four distinct points; triangles defined by three distinct points and lines by two distinct points. The disclosed methods and systems can automatically generate a set of elements by considering nodes/nodal-pointers four at a time. That is, by considering each element in a rectangular array (be such an element a node or nodal-pointer) in context with three neighboring elements, the element-building device 160 can automatically determine whether to establish a tetragon, a triangle, a line or no element at all.

Figure 6:
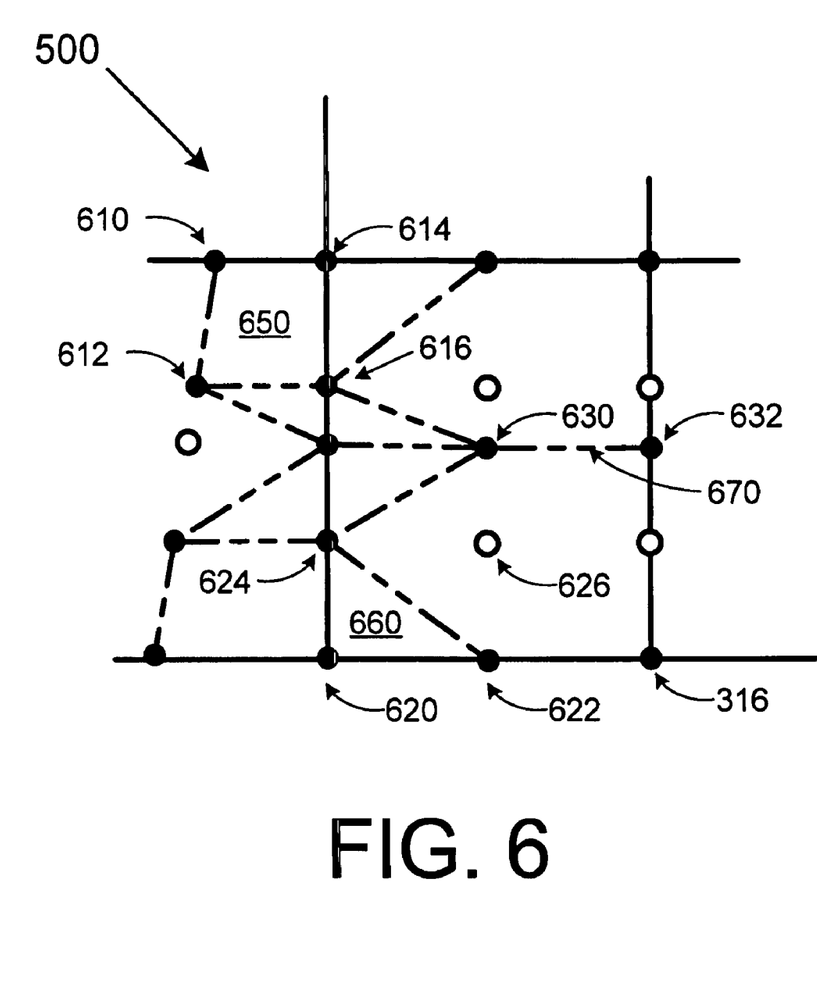
FIG. 6 depicts the an element formation process using the nodes and nodal-pointers of FIG. 5.

For instance, reviewing FIG. 6 it is apparent that a number of tetragons can be established whenever there are four distinct neighboring nodes. For example, by considering point 610 in context with neighboring nodes 612, 614 and 616, a tetradedron 650 can be formed.

In contrast, consider node 620 in context with neighbors 622-626 of which only two of such neighbors 622 and 624 are nodes. As is depicted in FIG. 6, nodal-pointer 626 will "collapse" onto the node immediately to its left (node 624) leaving only three distinct nodes 620, 622 and 624. Accordingly, in such situations the element-building device 160 can create triangle 652.

In a situation where two nodal-pointers collapse upon neighboring nodes, or situations where two adjacent nodes have no third or fourth neighboring node, lines may be formed. Foe example, as shown by nodes 630 and 632 (with only nodal-pointers above and below, there will be but two distinct points to consider. While a line (such as line 670) in the obvious candidate to consider, it should be appreciated that according to these simple rules outline so far, lines will not always be appropriate, .i.e., no element may be preferable to a line. In such cases, the element-building device 160 can use a set of more sophisticated rules to determine whether a line is appropriate, or optionally prompt an operator to take the decision whether to create a line.

Figure 7A:
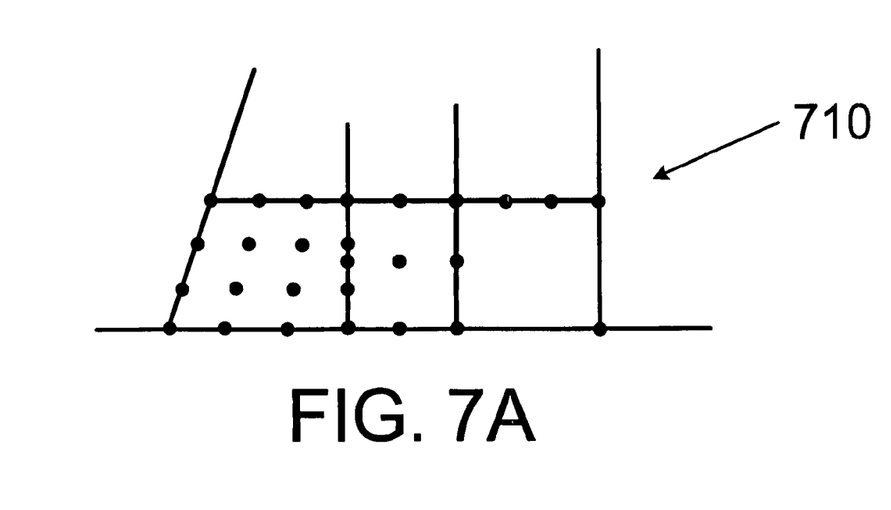
FIGS. 7A-7B depict a defining process of a family of elements based on the mesh of FIG. 3D and/or the array of FIG. 4B
Figure 7B:
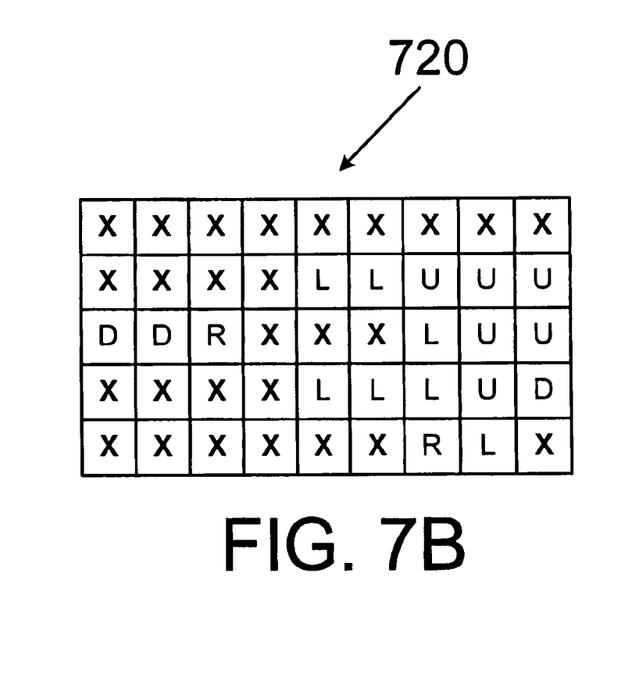

Again returning to FIG. 1, once the element-building device 160 has created the requisite elements from an array of nodes and nodal-pointers, an operator can optionally create one or more families of elements. In such instances, the family-defining device 170 can receive the set of elements created by the element-building device 150, whereby the operator can advantageously create sub-sets of elements. FIGS. 7A-7B depict how a subset of FEM points 710 can easily map onto a family-array 720, which itself can be used to define a family/subset of elements. While it may be advantageous to require a family of elements to maintain rectangular form, the present methods and systems are configured to allow the family-defining device 170 to define families of elements of any viable form.

Figure 8:
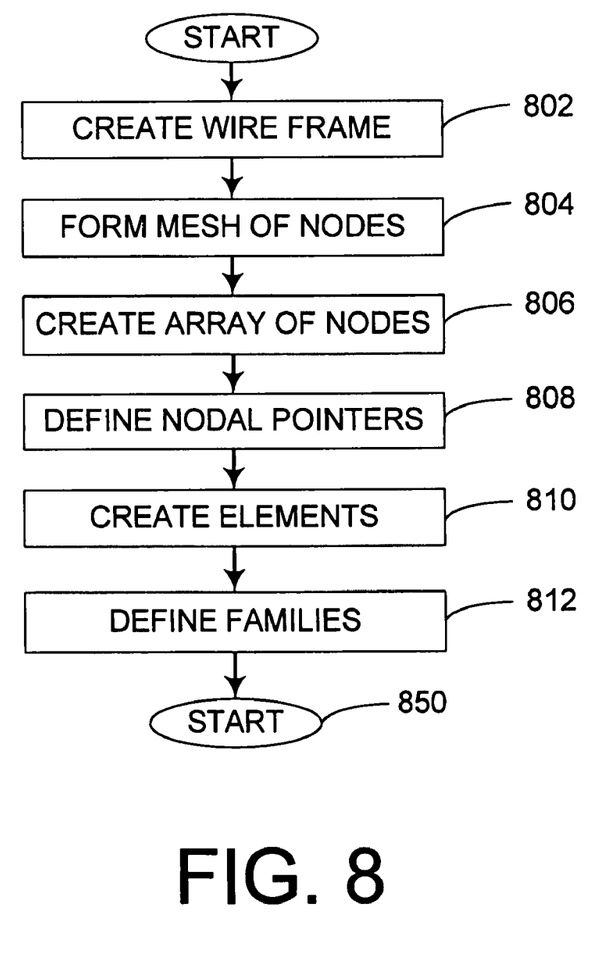
FIG. 8 is a flowchart outlining an exemplary operation for forming finite element models.

FIG. 8 is a flowchart outlining an exemplary operation according to the present disclosure for performing an audit. The process starts at step 802 where a frame, i.e., a wire-frame geometry is created. Next, in step 804, a mesh of points is overlayed/superimposed over the frame of step 810. Control continues to step 806.

In step 806, an array of nodes, is derived from the mesh of points. Next, in step 808, interstitial cells of the array of step 806 not occupied by nodes are defined as nodal-pointers referencing nearby nodes. Then, in step 810, a number of elements are derived based on the nodal-mesh according to the various rules discussed above. Control continues to step 812.

In step 812, one of more families of elements are established from the elements of step 810. Control then continues to step 850 where the process stops.

While the various inventive aspects of this disclosure have been generally described with regard to two-dimensional systems, it should be appreciated that the disclosed methods and systems are also applicable for three dimensional analysis. Accordingly, when extrapolating the disclosed and implicit concepts from two to three dimensions, the appropriate nomenclature may change. For example, in a two-dimensional embodiment one might describe the various relevant elemental shapes as "lines"/"arcs", "triangles" and "tetragons" ("polygons" in general), whereas the three-dimensional equivalents might better be described as "tetrahedrons", "pentahedrons" and "hexahedrons" ("polyhedrons" in general).

Further, while one might appropriately describe an N-by-M array as "rectangular" (or double-scripted), perhaps a more appropriate term for an N-by-M-by-P array might be a "pillar" array, even though technically such arrays may still be correctly referred to as rectangular in nature.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to finite-element modeling.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-readable storage medium including computer executable instructions that, when executed by a processor, perform a method for creating a finite element model of a structure, the method comprising the steps of:
    creating an array of nodes and nodal-pointers based on a wire-frame geometry representing the structure, the nodes and nodal-pointers being stored on the computer readable storage medium;
    creating a set of geometric-elements using the array of nodes and nodal-pointers, with a plurality of node paths collapsing upon one another while always maintaining a predetermined rectangular form of the nodes and nodal-pointers,
    assigning a set of one or more first points to a cell in a rectangular array including condensing at least two of the points onto one node; and
    using the finite element model to predict stresses in the structure.

2. The computer-readable storage medium of claim 1, wherein the step of creating an array includes the steps of: superimposing the set of one or more first points onto the wire-frame geometry, and assigning node status to the first set of first points.

3. The computer-readable storage medium of claim 2, further comprising the step of assigning each of the first points to the respective cell in the rectangular array.

4. The computer-readable storage medium of claim 3, further comprising the step of assigning each of the first points to the cell in a rectangular array to create an array of nodes.

5. The computer-readable storage medium of claim 4, wherein the array of nodes contains one or more interstitial gaps.

6. The computer-readable storage medium of claim 5, further comprising assigning the interstitial gaps of the rectangular array pointer status to create a rectangular array of nodes and nodal-pointers.

7. The computer-readable storage medium of claim 4, wherein the step of creating a set of geometric-elements is performed using a number of object-oriented software routines configured to manipulate rectangular arrays of nodes and nodal-pointers.

8. The computer-readable storage medium of claim 1, wherein creating a set of geometric-elements further includes the step of creating a triangular-element based on three nodes and one nodal-pointer.

9. The computer-readable storage medium of claim 1, wherein creating a set of geometric-elements further includes the step of creating a linear-element based on two nodes and two nodal-pointers.

10. The computer-readable storage medium of claim 9, wherein the step of creating a linear element is optional and based on a decision from an operator.

11. The computer-readable storage medium of claim 9, further comprising creating at least one family of geometric-elements from the set of geometric-elements, the family of geometric elements being a subset of a set of geometric-elements.

12. The computer-readable storage medium of claim 1, wherein the rectangular array is two-dimensional.

13. The computer-readable storage medium of claim 1, wherein the rectangular array is three-dimensional.

14. The computer-readable storage medium of claim 13, wherein creating a set of elements includes the step of creating a first polyhedral element based on at least five nodes.

15. An apparatus for creating a finite element model of a structure, comprising:
    a processor;
    a memory containing computer-executable instructions;
    an array-forming means for forming an array of nodes and plurality of nodal-pointers based on a mesh of points representing the structure;
    an element-building means for creating a set of geometric-elements using the array; and
    a family-defining means for defining at least one family of geometric-elements, wherein the family of geometric-elements contains a sub-set of geometric-elements formed by the element-building means, and wherein the family of geometric-elements is formed using a rectangular array;

wherein the family-defining means including the one family of geometric elements includes one or more object-oriented routines configured to form an array containing a plurality of nodes and at least one nodal-pointer for creating the finite element model, and the object-oriented routines and the plurality of nodes and the nodal-pointer being stored in the memory;

wherein the family-defining means of one or more object-oriented routines is configured to form a rectangular array regardless of the geometric form of the structure; and a means for assigning a set of one or more first points to a respective cell in a rectangular array, including condensing at least two of the points onto one node.

16. An apparatus for creating a finite element model of a structure, comprising:

a processor;

a memory containing an array of nodes representative of a geometric structure;

a collection of one or more object-oriented routines configured to create a the finite element model of the structure; and a means for assigning one or more first points to a respective cell in a rectangular array, including condensing at least two of the points onto one node;

wherein the object-oriented routines include a first subset of one or more object-oriented routines that, when executed by the processor, form an array containing a plurality of nodes and at least one nodal-pointer;

wherein the first subset of one or more object-oriented routines is configured to form a rectangular array regardless of the geometric form of the structure.

17. The apparatus of claim 16, wherein the array contains both nodes and nodal-pointers.

18. An apparatus for analyzing a structure, comprising:

a processor;

a memory;

an element-building device configured to operate on a rectangular array, wherein the rectangular array is an N-by-M array containing a plurality of nodes and at least one nodal pointer pointing to a first node for analyzing the structure, the element-building device being stored in the memory and being executable by the processor;

wherein the element-building device includes a number of object-oriented routines configured to derive a plurality of geometric-elements from the rectangular array, and wherein the derived geometric-elements include at least one of a polygon and a polyhedron;

wherein the object-oriented routines include a first subset of one or more object oriented routines that, when executed by the processor, form the array containing the plurality of nodes and the nodal-pointer, with the plurality of nodes and the nodal-pointer being stored in the memory;

wherein the first subset of one or more object-oriented routines is configured to form the rectangular array regardless of the geometric form of the structure; and a means for assigning one or more first points to a respective cell in the rectangular array, including condensing at least two of the points onto one node.

19. A computer-readable storage medium that stores a plurality of instructions that, when executed by a processor, enables a processor-based system to perform the following method comprising the steps of:

generating a collection of one or more object-oriented routines configured to create a finite element model of a structure;

executing the object-oriented routines including a first subset of one or more object routines that, when executed by the processor form a rectangular array containing a plurality of nodes and at least one nodal pointer, the first subset of the object-oriented routines being configured to form the rectangular array regardless of the geometric form of the structure;

collapsing a plurality of node paths upon one another while the rectangular array of the nodes and nodal-pointers is maintained;

assigning a set of one or more points to a cell in the rectangular array;

condensing at least two of the points onto one of the nodes; and using the finite element model to predict stresses in the structure.

20. The computer-readable storage medium of claim 19, wherein the object-oriented routines further include a second subset of one or more object-oriented routines capable of forming a number of geometric-elements based on the array.

21. The computer-readable storage media of claim 19, wherein both an array forming device forming the array containing the plurality of nodes and at least one nodal pointer, the array forming device being connected to the processor that enables the processor-based system to operate on the finite element models.

* * * * *

UNITED STATES PATENT AND TRADEMARK OFFICE
CERTIFICATE OF CORRECTION

PATENT NO.        : 7,606,688 B2                                                Page 1 of 1
APPLICATION NO.   : 10/898931
DATED             : October 20, 2009
INVENTOR(S)       : Paul Z. Thunemann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twelfth Day of October, 2010

David J. Kappos
*Director of the United States Patent and Trademark Office*